(12) United States Patent
Gross

(10) Patent No.: US 7,000,896 B2
(45) Date of Patent: Feb. 21, 2006

(54) REVERSIBLE BALL VALVE HANDLE

(76) Inventor: Donald P. Gross, 7240 Standard Dr., Hanover, MD (US) 21076

( * ) Notice: Subject to any disclaimer, the term of this patent is extended or adjusted under 35 U.S.C. 154(b) by 32 days.

(21) Appl. No.: 10/770,364

(22) Filed: Feb. 2, 2004

(65) Prior Publication Data

US 2005/0167628 A1    Aug. 4, 2005

(51) Int. Cl.
*F16K 31/00*    (2006.01)
(52) U.S. Cl. ...................... 251/285; 251/286
(58) Field of Classification Search ......... 251/284–289
See application file for complete search history.

(56) References Cited

U.S. PATENT DOCUMENTS

| 31,465 | A | * | 2/1861 | Leffingwell ................. 251/285 |
|---|---|---|---|---|
| 280,176 | A | | 6/1883 | Higgins |
| 3,528,640 | A | | 9/1970 | Smith |
| 4,559,966 | A | | 12/1985 | Massey et al. |
| 4,747,427 | A | | 5/1988 | Smith et al. |
| 4,852,610 | A | | 8/1989 | McHugh |
| 5,139,041 | A | | 8/1992 | Albrecht |
| 5,259,589 | A | | 11/1993 | Posner |
| 5,329,959 | A | * | 7/1994 | Owen et al. ........... 137/315.17 |
| 5,482,251 | A | | 1/1996 | Roberts |
| 5,647,389 | A | | 7/1997 | Holloway |
| 6,568,422 | B1 | | 5/2003 | Niessen |

* cited by examiner

*Primary Examiner*—J. Casimer Jacyna
(74) *Attorney, Agent, or Firm*—Rankin, Hill, Porter & Clark LLP

(57) ABSTRACT

A valve having a valve body, a rotary valve member, a valve handle, and a selectively repositionable valve handle stop member. The valve body includes first and second openings into which the stop member may be installed. The openings are provided on opposite sides of the lower end of the valve handle such that, when the stop member is installed in the first opening, the valve handle is rotated in a first direction between a first orientation, which corresponds to the valve member being full open, and a second orientation, which corresponds to the valve member being full closed. Alternatively, when the stop member is installed in the second opening, the valve handle is rotated in a second, opposite direction to move the valve member from the full open to the full closed position. When no stop member is installed, the valve member is sequentially moved from the full closed position, to the full open position, and then to the full closed position as the valve handle traverses a 180° arc.

8 Claims, 6 Drawing Sheets

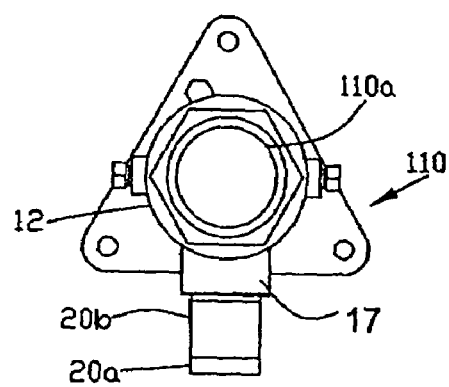
FIG. 6
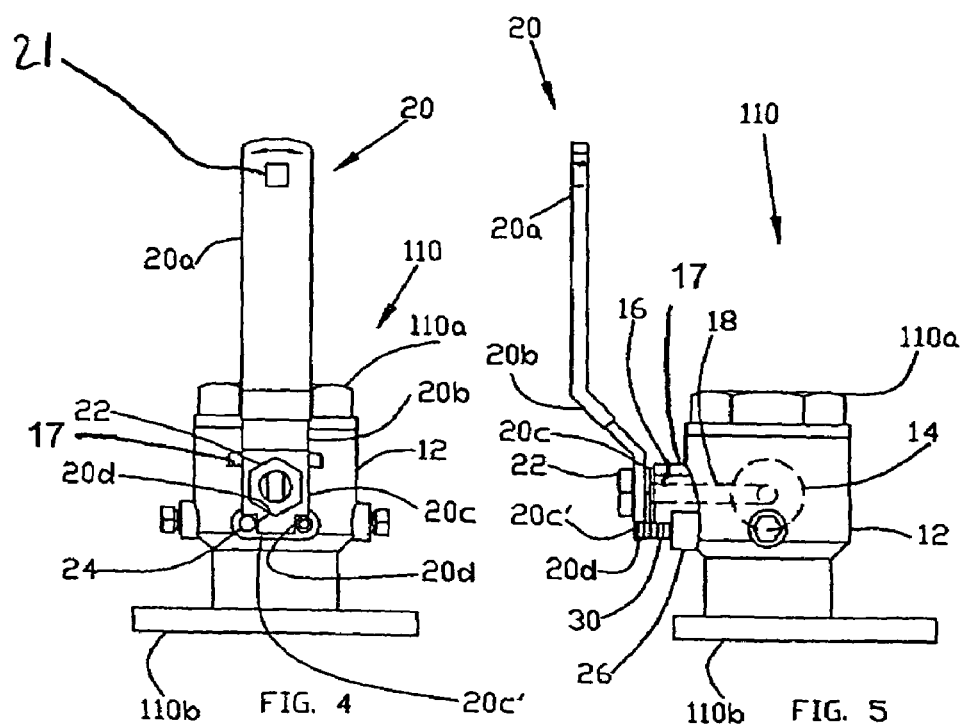
FIG. 4
FIG. 5

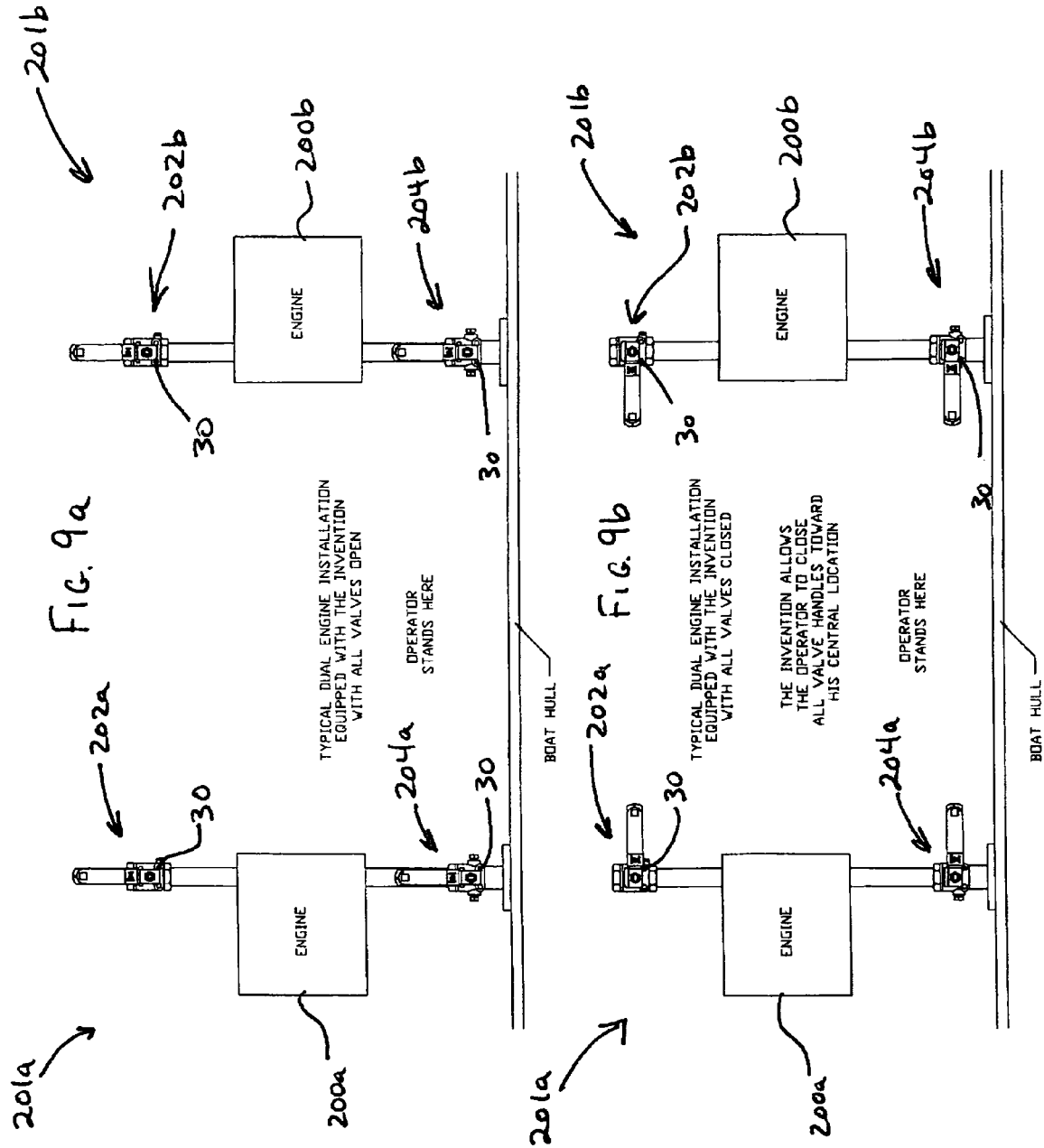

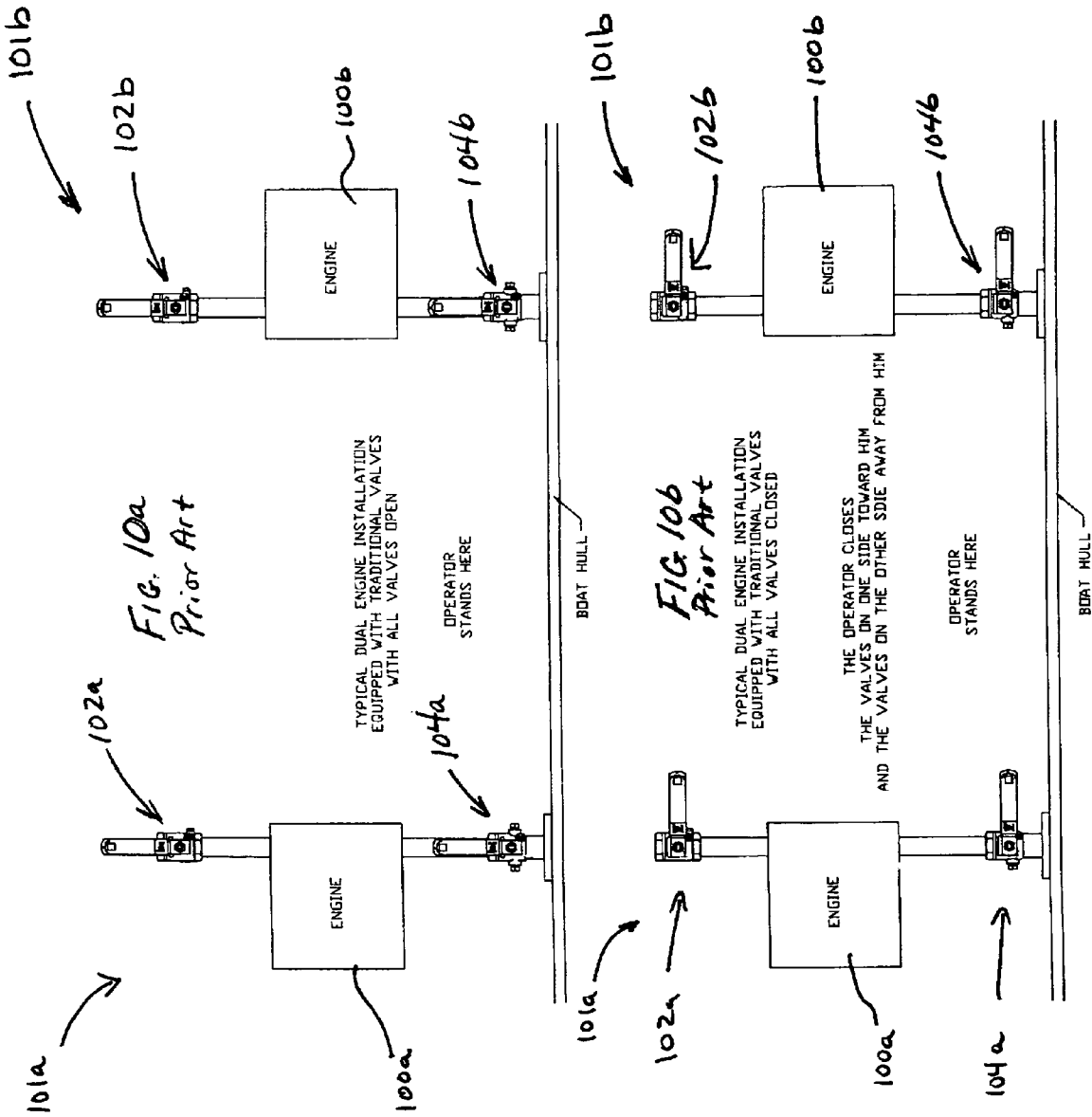

REVERSIBLE BALL VALVE HANDLE

BACKGROUND OF THE INVENTION

1. Field of the Invention

The present invention generally relates to ball valves and, more particularly, toward handle stops for ball valves.

2. Description of Related Art

Two types of valves are used in the marine industry. The first type is known as a "seacock", having its top port threaded for a National Pipe Tapered Threads Standard (NPT) connection and its bottom port flanged and threaded for a National Pipe Straight Threads Standard (NPS) connection, and are generally used in engine cooling systems or any system that passes water between the outside of the vessel and the inside of the vessel. The second type of valve is known as an "in-line" valve having NPT threaded ports at each end, and generally used for on-board plumbing systems. In marine vessels, plumbing systems for fuel supply and for various on-board systems are generally equipped with "in-line" ball valves. Engine cooling systems are generally equipped with "seacocks".

With reference to FIGS. 10a–10b, because there are two or more engines 100a, 100b in many marine vessels, plumbing systems 101a, 101b are dedicated to each engine and duplicated for the same purpose on each other engine. Access to the vessel engine room is generally on the vessel centerline, between the engines 100a, 100b. Once in the engine room, one who wishes to operate any of the valves therein must look left to operate the valves 102a, 104a of the one plumbing system 101a in the port (left) side of the vessel, and then look right to operate the valves 102b, 104b of the second plumbing system 101b in the starboard (right) side of the vessel.

With both types of valves, assuming the valves 102a, 104a on the port (left) side of the vessel are installed so as to have their handle facing inboard when in the closed position, the corresponding valve 102b, 104b that serves the same purpose on the starboard (right) side of the vessel would have its handle facing outboard when in the closed position. This situation is shown in FIG. 10b. Or, the starboard valve could be oriented so as to have its handle facing outboard when closed, but the direction of handle rotation would be the opposite of the valve on the port side. Neither option is desirable, as it is visually confusing, which could result in valve damage if the operator were to force the valve handle in a wrong, but logical direction. With seacocks, the latter option is not possible due to the different threading and mounting details on opposite ends of the valve.

It is desirable to have all valves, regardless of their type or which side of the vessel they are installed on to have their handles in the same relative position (inboard or outboard) when in the closed position, as this makes valve operation more convenient and more logical. Selectively changeable handle rotation direction is particularly useful for seacocks, as this type valve cannot be selectively installed (end for end).

SUMMARY OF THE INVENTION

The present invention is intended to provide more logical operation of valves installed on corresponding but opposite sides of duplicated plumbing systems, such as are common in marine applications, and to present a uniform appearance of numerous ball valves installed in a complex multi-valve system. The direction of handle rotation can easily be changed at the time of installation, or at any time thereafter resulting in uniform appearance and logical, safe operation. Additionally, the obvious closed valve position (perpendicular to the flow direction) is maintained, regardless of where the valve is placed.

In accordance with the present invention, a valve includes a valve body, a valve member, a valve handle, and a selectively repositionable stop member. The valve body defines an inlet and an outlet and has first and second threaded openings that are each adapted to receive the stop member. The valve member is disposed within the valve body and is rotatably movable between a closed position and an open position. The valve handle is operatively associated with the valve member and is movable between a first orientation corresponding to the open position of the valve member and a second orientation corresponding to the closed position of the valve member.

The stop member is selectively installed into one of the first and second threaded openings and is positioned to engage a lower end of the valve handle so as to limit rotation of the valve handle. Accordingly, when the stop member, which preferably is a threaded fastener, is installed in the first threaded opening the valve handle is moved in a first direction between the first and second orientations and, when the stop member is installed in the second threaded opening, the valve handle is moved in a second direction between said first and second orientations.

Further, with the present invention it is possible to remove (or not install) the stop member and thereby permit the handle to move from closed-open-closed position as it traverses a 180° arc. Therefore, the present invention permits further handle motion customization.

BRIEF DESCRIPTION OF THE DRAWINGS

These and further features of the present invention will be apparent with reference to the following description and drawings, wherein:

FIG. 4 is front elevational view of a second embodiment of a seacock ball valve incorporating the present invention;

FIG. 5 is a side elevational view thereof;

FIG. 6 is a top plan view thereof;

FIGS. 9a–9b schematically illustrate operation of the valves according to the present invention in a vessel; and, FIGS. 10a–10b schematically illustrate operation of valves according to the prior art.

DETAILED DESCRIPTION OF THE PREFERRED EMBODIMENTS

Figure 3:
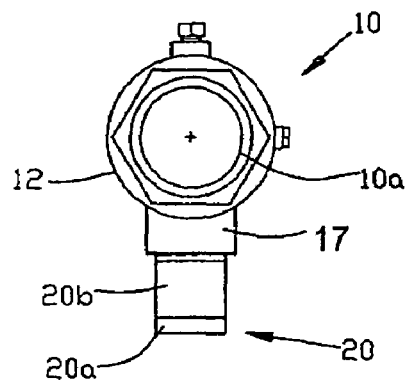
FIG. 3 is a top plan view thereof.
Figure 1:
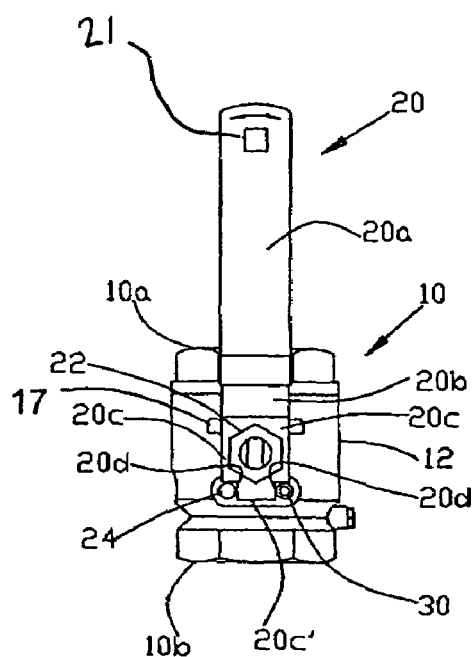
FIG. 1 is front elevational view of a first embodiment of an in-line ball valve incorporating the present invention.
Figure 2:
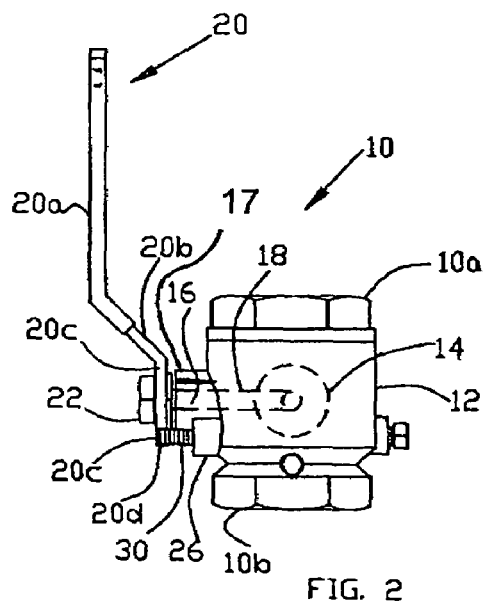
FIG. 2 is a side elevational view thereof.

With reference to FIGS. 1–3, a first embodiment of the present invention is illustrated in connection with an in-line valve 10 that has NPT threads at each end 10a, 10b for attachment to pipes of a plumbing system. The valve 10 includes a valve body 12, a valve stem 18 extending from the valve body 12, and a valve handle 20 affixed to the valve stem 18 and operable to rotate the valve stem 18 and a valve ball 14 (i.e., the valve member) associated therewith.

The valve 10 may be a quarter turn valve whereby rotation of the valve ball 14, via the valve stem 18, 90° will move the valve ball 14 from a closed position to an open position. The handle 20 is aligned with the axis valve body 12 when in the full open position. As will be apparent from the following description, the present invention is directed toward an improved valve structure whereby the direction of valve operation can be easily adjusted so as to conform to the environment in which the valve is used.

To that end, the valve body 12 includes a neck 16 through which the valve stem 18 extends and to which the rotary valve handle 20 is secured. Accordingly, rotation or pivotal movement of the valve handle 20 will cause the valve stem 18 and valve ball 14 to rotate. A fixed stop 17 projects from the valve body 12 at a location relatively above the neck 16 and extends laterally on either side of the neck and the handle 20. Naturally, suitable packing or sealing (not shown) is provided to prevent leakage around the valve stem 18 and the valve neck 16, and suitable drain connections are provided in the valve body 12, as is known in the art.

The valve handle 20 preferably has an upper end portion 20a, an intermediate, angled portion 20b, and a lower portion 20c. The upper portion 20a and lower portion 20c are preferably parallel with one another whereas the intermediate portion 20b is angled with respect to the upper and lower portions 20a, 20c so as to space the upper portion 20a outwardly (away from the valve body 12) relative to the lower portion 20c. Preferably, the lower portion 20c is secured to the valve stem 18 by a mounting nut 22, and includes an inwardly bent portion 20c' at its terminal end.

The inwardly bent portion 20c' is formed so as to project toward the valve body 12 and is disposed relatively beneath the neck 16 and between raised portions 26 of the valve body, described hereinafter. A pair of notches 20d are formed in the valve handle lower portion 20c, and are disposed on laterally opposite sides of the inwardly bent portion 20c'. The upper end portion 20a of the valve handle 20 defines a generally square opening 21 oriented generally transverse to a longitudinal axis of the valve handle.

First and second threaded bores 24 are formed in the valve body 12. The first and second threaded bores 24 are provided on the raised portions 26 of the valve body 12 at a location that is generally offset from the longitudinal axis of the valve body and aligned with the valve handle lower end 20c. Moreover, the raised portions 26 are provided on laterally opposite sides of the valve handle inwardly bent portion 20c' so as to be aligned with the notches 20d in the valve handle lower portion when the valve handle is in an orientation corresponding to the valve member full open position, as illustrated. Further, the raised portions 26 are inset from the inwardly bent portion 20c' so as to provide a clearance between the inwardly bent portion 20c' and the raised portions 26 and thereby permit the bent portion 20c' to move past the raised portions 26 as the handle 20 is rotated.

Figure 8:
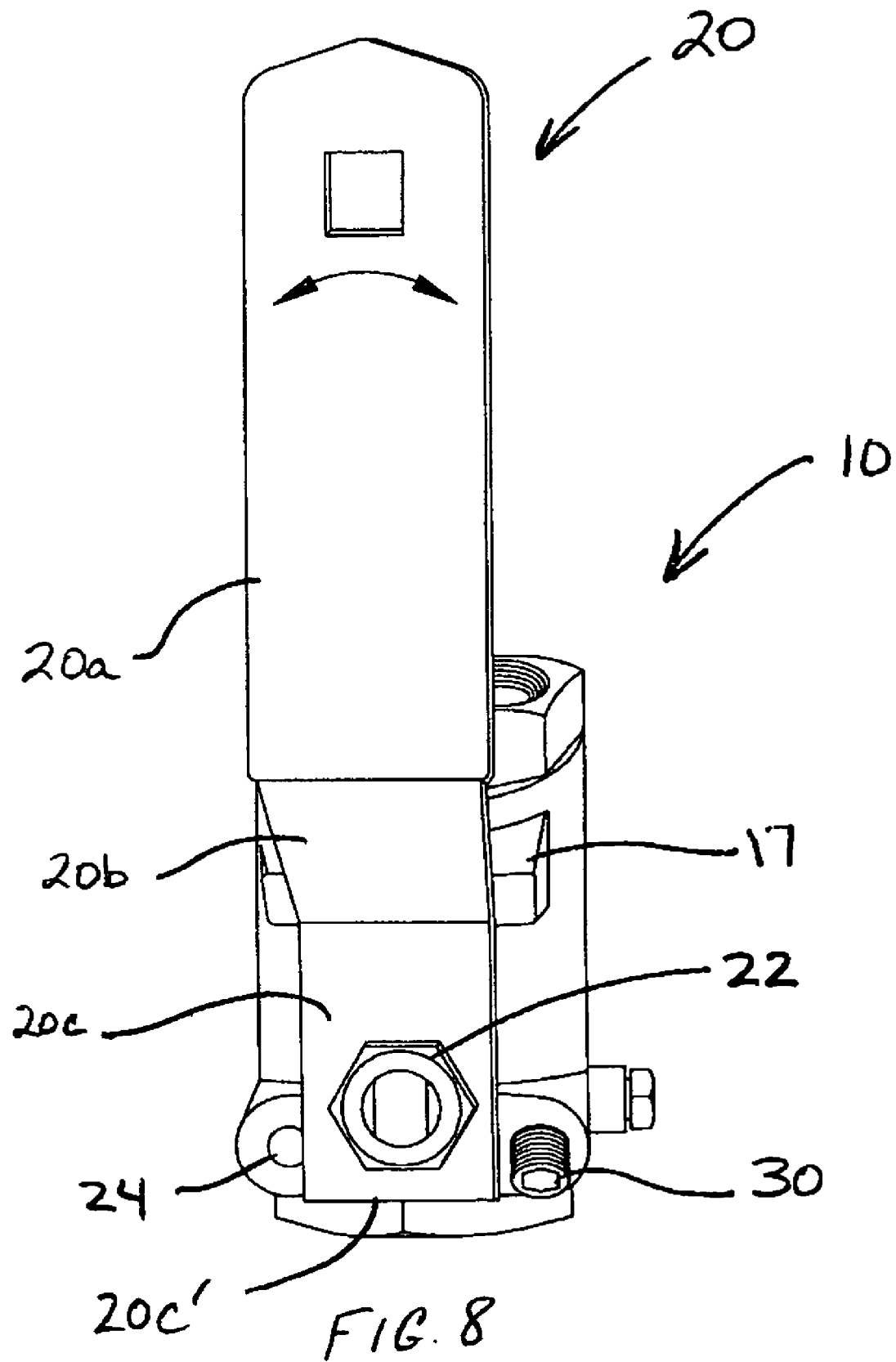
FIG. 8 is a perspective view of an alternative to the first embodiment in-line valve.

As such, the threaded bores 24 are provided at a position spaced slightly laterally from the valve handle inwardly bent portion 20c'. Each of the threaded bores 24 is adapted to receive a threaded fastener 30, such as the illustrated Allen screw. The threaded fastener 30 projects from the raised portion 26 so as to be in a position to engage the inwardly bent portion 20c' of the valve handle 20. During normal operation of the valve, the threaded fastener 30 will be installed in only one of the threaded bores 24, as illustrated, and will be engaged by the handle inwardly bent portion 20c'. Accordingly, the threaded fastener 30 serves as a stop to prevent or limit rotation of the valve handle 20 to 90° in one direction, as will be apparent from the following description. FIG. 8 illustrates an alternative, though substantially equivalent, in-line valve 10 in which the handle 20 does not have notches formed at its lower end.

Figure 7:
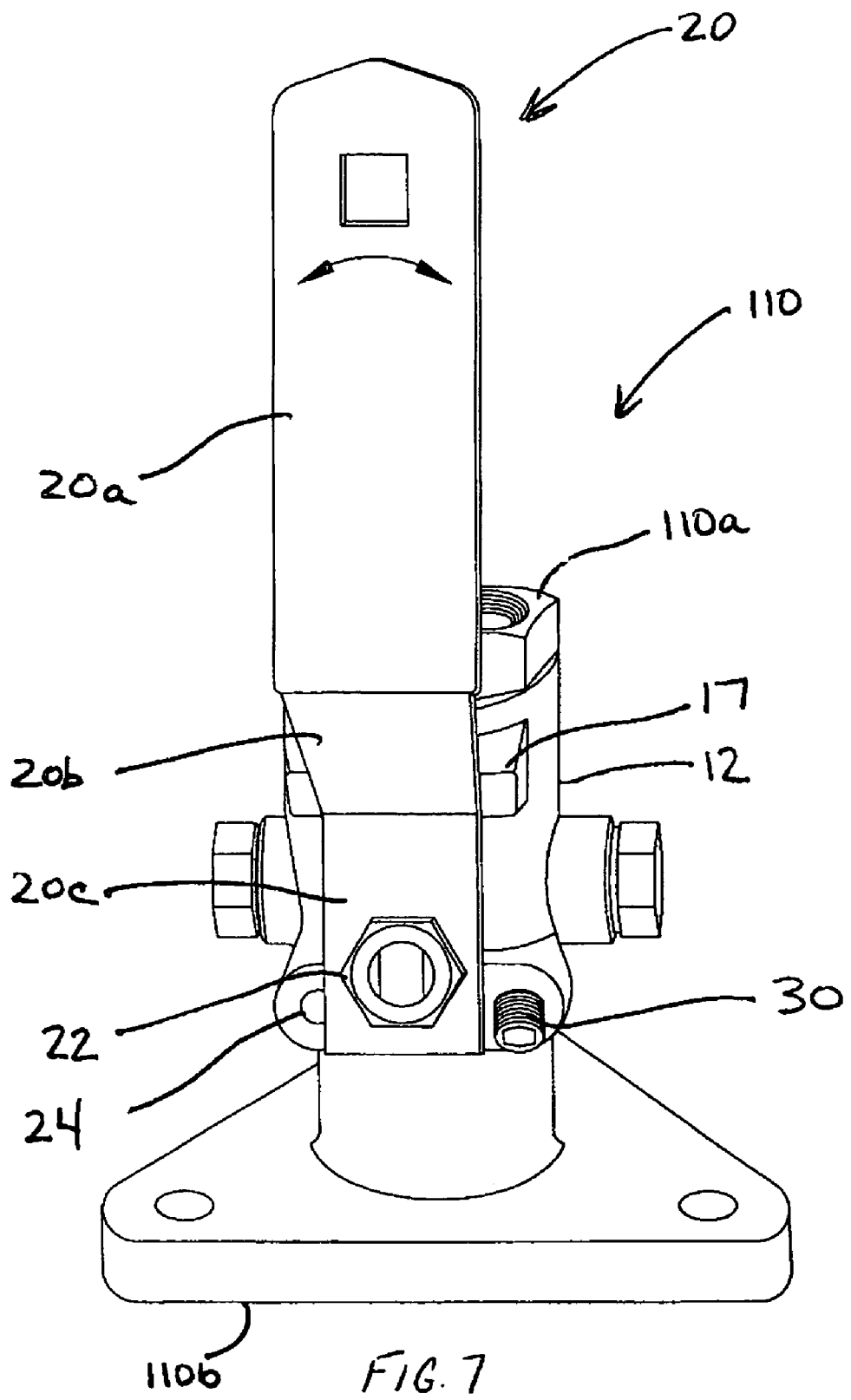
FIG. 7 is a perspective view of an alternative to the second embodiment seacock ball valve.

With reference to FIGS. 4–6, a second embodiment of the present invention is illustrated in connection with a seacock-type ball valve 110 having a top port 110a threaded for NPT connection and its bottom port 110b flanged and threaded for NPS connection. FIG. 7 illustrates an alternative, though substantially equivalent, seacock valve 10 wherein the handle 20 does not have notches formed at its lower end. The valve 110 of FIGS. 4–7 has been given identical reference numerals, where appropriate, to that of the in-line valve 10 of FIGS. 1–3. Aside from the basic structural differences, the valves 10 and 110 are operationally identical, and use of the valves 10 and 110 in connection with the present invention will be described hereinafter.

With the threaded fastener 30 installed in the valve body 12, the valve handle 20 will be rotatable 90° in one direction between an open position substantially aligned with the axis of the valve body 12, as illustrated, and a closed position transverse to the valve body. The valve handle 20 engages the fastener 30 when in the open position and engages the fixed stop 17 when in the closed position.

If the user decides to not install the threaded fastener 30, then the handle will be rotatably 180° and will sequentially move from the closed position, to the open position, and then to the closed position. This freedom of movement may be desirable for certain users in some situations, and is particularly useful during installation.

At some point it is desired to change the direction of valve handle rotation between the full closed and full open positions. Therefore, with the handle 20 oriented in the position corresponding to the valve member full open position (as illustrated) and the threaded fastener 30 is removed from the first threaded bore 24 and inserted into the second threaded bore 24. Thereafter, the valve handle 20 will be rotated in the opposite direction to move the valve ball 14 from the full open to the full closed position.

Therefore, with the present invention, the direction of valve handle rotation can be quickly and easily changed without disassembly of the valve 10, 110. Accordingly, the direction of valve operation or rotation can be coordinated to the position of the valve 10, 110 within the marine vessel so as to provide a more intuitive method of operation.

More specifically, and with reference to FIGS. 9a–9b, it is desirable to have all valves, regardless of their type or which side of the vessel they are installed on to have their handles in the same relative position (inboard or outboard) when in the closed position, as this makes valve operation more convenient and more logical. The selectively changeable valve handle rotation direction provided by the present invention is particularly useful for seacocks, as this type valve cannot be selectively installed (end for end).

FIG. 9a illustrates the condition wherein valves 202a, 204a on one side 201a of the vessel (associated with a first engine 200a) are open and wherein valves 202b, 204b on the other side 201b of the vessel (associated with a second engine 200b) are also open. It is noted that the valve handles 20 are all pointing in the same direction and are in-line with the axis of the associated valves. FIG. 9b shows the situation wherein the valves 202a, 204a; 202b, 204b are closed, with the valve handles all conveniently pointing inboard toward each other. It is noted that the threaded fastener 30 is placed in one position (i.e., in one hole 24) for the left valves 202a, 204a, and is placed in another position (i.e., the other hole 24) for the right valves 202b, 204b.

In a marine vessel having valves according to the present invention, the valves 10, 100 may be installed without regard to the direction of handle rotation, and thereafter the handle rotation direction may be altered, as desired, by simply repositioning the threaded fastener 30 within the threaded bores 24 so as to give a logical and consistent operation of the valves on opposite sides of the vessel. Accordingly, the present invention permits a more intuitive valve operation for the user.

Although the preferred embodiments of the present invention have been described with particularity in the foregoing, it is considered apparent that the present invention is not limited thereto. For example, while the present invention is particularly well suited for use within the marine industry, it is also well suited for any industry where ball valves are used (automotive, industrial, residential, etc).

What is claimed is:

1. A valve, comprising:
    a valve body defining an inlet and an outlet, said valve body defining a first opening and a second opening;
    a valve member disposed within said valve body and rotatably movable between a closed position and an open position;
    a valve handle comprising an upper portion, an intermediate portion, and a lower portion including an inwardly bent portion that extends toward said valve body, said lower portion being secured to a valve stem of said valve member and being operable to rotate said valve member, said upper and lower portions being generally parallel to one another and said intermediate portion being at an angle to said upper and lower portions and interconnecting said upper and lower portions so as to space said upper portion laterally from said valve body, said valve handle being movable between a first position corresponding to the closed position of said valve member and a second position corresponding to the open position of said valve member; and
    wherein each of said first and second openings is adapted to receive a stop member that, when installed in one of said first and second openings, is adapted to engage said inwardly bent portion of said lower portion of said valve handle to limit rotation of said valve handle and wherein, when said stop member is installed in said first opening, said valve handle is moved in a first direction between said first and second positions and wherein, when said stop member is installed in said second opening, said valve handle is moved in a second direction between said first and second positions, and wherein, when said stop member is not installed in either of said first and second openings, said valve handle is movable in either of said first and second directions.

2. The valve according to claim 1, wherein said valve body includes a raised portion and said first and second openings are formed in said raised portion.

3. The valve according to claim 1, wherein said valve body includes first and second raised portions and said first opening is formed in said first raised portion and said second opening is formed in said second raised portion.

4. The valve according to claim 1, wherein said upper portion includes a generally square opening oriented generally transverse to a longitudinal axis of said valve handle.

5. A valve, comprising:
    a valve body defining an inlet and an outlet, said valve body defining a first threaded opening and a second threaded opening;
    a valve member disposed within said valve body and rotatably movable between a closed position and an open position;
    a valve handle comprising an upper portion, an intermediate portion, and a lower portion including an inwardly bent portion that extends toward said valve body, said lower portion being secured to a valve stem of said valve member and being operable to rotate said valve member, said upper and lower portions being generally parallel to one another and said intermediate portion being at an angle to said upper and lower portions and interconnecting said upper and lower portions so as to space said upper portion laterally from said valve body, said valve handle being movable between a first position corresponding to the closed position of said valve member and a second position corresponding to the open position of said valve member; and
    wherein each of said first and second openings is adapted to receive a stop member which is a threaded fastener and that, when installed in one of said first and second openings, is adapted to engage said inwardly bent portion of said lower portion of said valve handle to limit rotation of said valve handle and wherein, when said stop member is installed in said first opening, said valve handle is moved in a first direction between said first and second positions and wherein, when said stop member is installed in said second opening, said valve handle is moved in a second direction between said first and second positions, and wherein, when said stop member is not installed in either of said first and second openings, said valve handle is movable in either of said first and second directions.

6. The valve according to claim 5, wherein said valve body includes a raised portion and said first and second threaded openings are formed in said raised portion.

7. The valve according to claim 5, wherein said valve body includes first and second raised portions and said first threaded opening is formed in said first raised portion and said second threaded opening is formed in said second raised portion.

8. A method for changing a direction of operation of a ball valve, said ball valve comprising a valve body, a valve member, and a valve handle, said valve member being rotatably disposed within said valve body and being rotatably movable between a full closed position and a full open position, said valve handle being secured to said valve member and being movable in a first direction and an opposite, second direction to move said valve handle from a first orientation, corresponding to the full open position of the valve member, and a second orientation, corresponding to the full closed position of said valve member, said valve body defining first and second threaded openings disposed on opposite sides of a lower end of said valve handle when said valve handle is in the first orientation, each of said openings being adapted to receive a stop member that is a threaded fastener and that limits rotation of said valve handle to one of said first and second directions, the method comprising the steps of:
    moving said handle into the first orientation such that said handle lower portion is in engagement with said stop member received in one of said first and second openings;
    removing said threaded fastener by rotating said threaded fastener in a first direction to unthread said threaded fastener from said one of said first and second threaded openings; and
    installing said threaded fastener by rotating said threaded fastener in a second direction to thread said threaded fastener into said other of said first and second openings.

* * * * *